(12) United States Patent
Sugimoto et al.

(10) Patent No.: US 11,247,622 B2
(45) Date of Patent: Feb. 15, 2022

(54) BUMPER REINFORCEMENT

(71) Applicants: AISIN CORPORATION, Kariya (JP); TOYOTA JIDOSHA KABUSHIKI KAISHA, Toyota (JP)

(72) Inventors: Shiho Sugimoto, Kariya (JP); Kiyoichi Kita, Okazaki (JP); Jun Shobo, Anjo (JP); Junichi Takayanagi, Nagoya (JP); Ryoichi Hayashi, Kariya (JP); Naohiro Saito, Toyota (JP)

(73) Assignees: Aisin Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 73 days.

(21) Appl. No.: 16/733,395

(22) Filed: Jan. 3, 2020

(65) Prior Publication Data

US 2020/0216004 A1 Jul. 9, 2020

(30) Foreign Application Priority Data

Jan. 9, 2019 (JP) .............................. JP2019-001672

(51) Int. Cl.
  *B60R 19/03* (2006.01)
  *B60R 19/24* (2006.01)
  *B60R 19/02* (2006.01)
  *B60R 19/04* (2006.01)
  (Continued)

(52) U.S. Cl.
  CPC ............ *B60R 19/03* (2013.01); *B60R 19/023* (2013.01); *B60R 19/04* (2013.01); *B60R 19/24* (2013.01); *B60R 2019/1853* (2013.01); *B60R 2021/0004* (2013.01); *B60R 2021/0025* (2013.01)

(58) Field of Classification Search
  CPC ....... B60R 13/04; B60R 19/03; B60R 19/023; B60R 19/24; B60R 2019/1853; B60R 2021/0004; B60R 2021/0025; B60R 19/04
  See application file for complete search history.

(56) References Cited

U.S. PATENT DOCUMENTS

| 2016/0159300 A1 | 6/2016 | Matecki et al. |
| 2018/0050736 A1* | 2/2018 | Teshima .................. B60R 19/02 |
| 2020/0086815 A1 | 3/2020 | Koga et al. |

FOREIGN PATENT DOCUMENTS

| JP | 2015-147437 | 8/2015 |
| WO | WO2018/173759 A1 | 9/2018 |

* cited by examiner

*Primary Examiner* — D Glenn Dayoan
*Assistant Examiner* — Melissa Ann Bonifazi
(74) *Attorney, Agent, or Firm* — Finnegan, Henderson, Farabow, Garrett & Dunner, LLP

(57) ABSTRACT

A bumper reinforcement includes a body portion joined to a vehicle body front end portion through portions of the body portion on a first direction side and a second direction side in the vehicle width direction, and a reinforcing member joined to the body portion along the body portion. The body portion includes a first standard rigidity region, a high rigidity region, and a second standard rigidity region arrayed next to each other in this order in the vehicle width direction. The high rigidity region has rigidity higher than rigidity of the first standard rigidity region and rigidity of the second standard rigidity region and is positioned in a center of the body portion in the vehicle width direction. The reinforcing member is provided so as to at least partially overlap the high rigidity region and the first standard rigidity region through a first boundary position.

7 Claims, 4 Drawing Sheets

(51) Int. Cl.
*B60R 19/18* (2006.01)
*B60R 21/00* (2006.01)

BUMPER REINFORCEMENT

INCORPORATION BY REFERENCE

The disclosure of Japanese Patent Application No. 2019-001672 filed on Jan. 9, 2019 including the specification, drawings and abstract is incorporated herein by reference in its entirety.

BACKGROUND

1. Technical Field

The disclosure relates to a bumper reinforcement.

2. Description of Related Art

As a related art in which a configuration of a bumper reinforcement is disclosed, there is Japanese Unexamined Patent Application Publication No. 2015-147437 (JP 2015-147437 A). The bumper reinforcement described in JP 2015-147437 A includes a bumper reinforcement body and a center reinforcement part. The bumper reinforcement body is attached to front end portions of right and left vehicle body skeleton members that extend in a vehicle front-rear direction, and arranged on a front end portion of a vehicle so that a longitudinal direction of the bumper reinforcement body is a vehicle width direction. The center reinforcement part is fixed to or integrally formed with a rear portion of a center portion of the bumper reinforcement body in the vehicle width direction.

SUMMARY

There are instances where an engine unit having a first mechanical portion and a second mechanical portion is arranged in a front part of a vehicle. The first mechanical portion and the second mechanical portion are fastened to each other behind the bumper reinforcement in the vehicle front-rear direction so that the first mechanical portion and the second mechanical portion are next to each other in the vehicle width direction. The engine unit is connected with and supported by vehicle body skeleton members. A width of the first mechanical portion is larger than a width of the second mechanical portion in the vehicle width direction. A rear surface of the first mechanical portion in the vehicle front-rear direction faces a body of the vehicle. A rear support portion fixed to the body of the vehicle is provided behind the second mechanical portion in the vehicle front-rear direction.

When a center pole collision occurs, and the bumper reinforcement is bent in front of the first mechanical portion in the vehicle front-rear direction, due to shear force applied to the first mechanical portion by the bent portion of the bumper reinforcement, the engine unit splits at a fastening surface between the first mechanical portion and the second mechanical portion, and the separated first mechanical portion may press the body of the vehicle locally.

Meanwhile, when a center pole collision occurs and the bumper reinforcement is bent in front of the second mechanical portion in the vehicle front-rear direction, the rear support portion receives a part of shear force that is applied to the second mechanical portion by the bent portion of the bumper reinforcement. Thus, the engine unit is not split, and the bumper reinforcement is bent further in front of the first mechanical portion in the vehicle front-rear direction. In this case, a part of the bumper reinforcement sandwiched between the two bent portions comes into surface contact with the engine unit, and a load at the time of the collision is dispersed and acts on the engine unit. As a result, it is inhibited that the body of the vehicle is locally pressed.

Therefore, it is necessary to control a position of a spot of the bumper reinforcement in the vehicle width direction, the spot being bent first when the center pole collision occurs.

The disclosure has been accomplished in order to control a position of a spot of a bumper reinforcement in the vehicle width direction, the spot being bent first when a center pole collision occurs. Thus, it is possible to inhibit that a body of a vehicle is pressed locally.

An aspect of the disclosure is a bumper reinforcement. The bumper reinforcement includes a body portion and a reinforcing member. The body portion extends in a vehicle width direction and is joined to a vehicle body front end portion through portions of the body portion on a first direction side and a second direction side in the vehicle width direction. The reinforcing member is joined to the body portion along the body portion. The body portion includes a first standard rigidity region, a high rigidity region, and a second standard rigidity region that are arrayed next to each other in this order in the vehicle width direction. The high rigidity region has rigidity higher than rigidity of the first standard rigidity region and rigidity of the second standard rigidity region and is positioned in a center of the body portion in the vehicle width direction. The first standard rigidity region is positioned on the first direction side of the high rigidity region in the vehicle width direction. The second standard rigidity region is positioned on the second direction side of the high rigidity region in the vehicle width direction. The reinforcing member is provided so as to at least partially overlap the high rigidity region and the first standard rigidity region through a first boundary position so that the reinforcing member crosses the first boundary position. The first boundary position is at a position of a boundary between the high rigidity region and the first standard rigidity region in the vehicle width direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
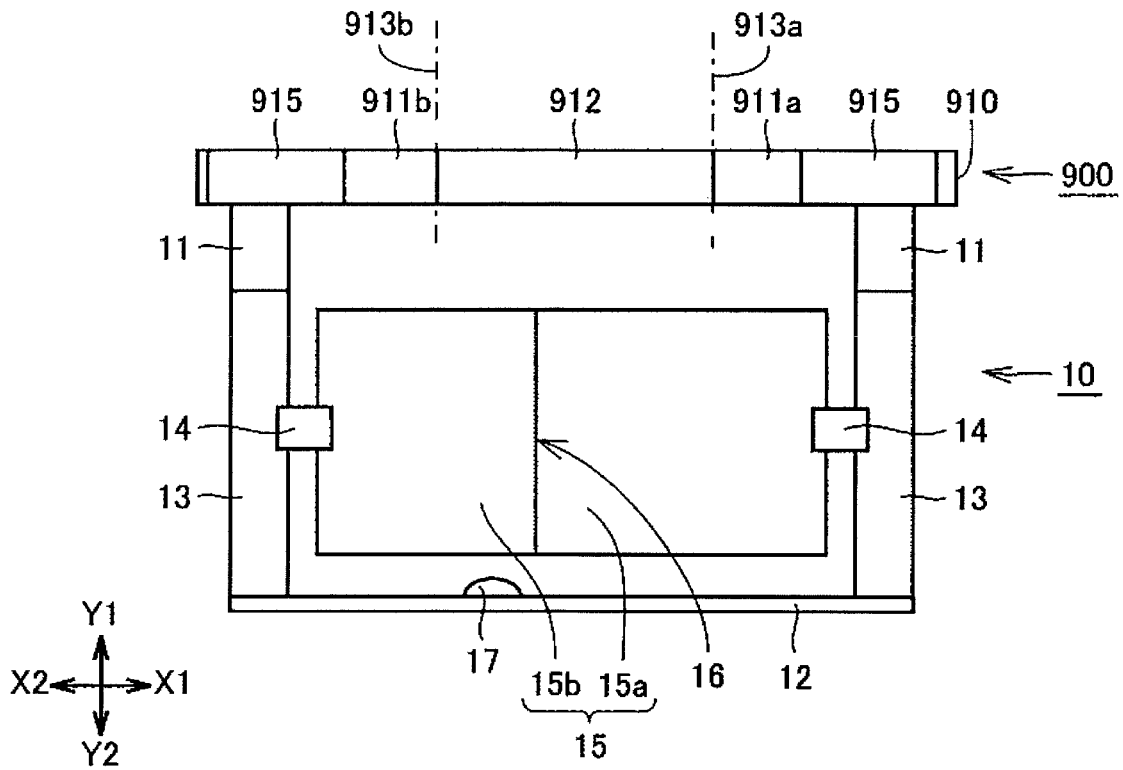
FIG. 1 is a view of a bumper reinforcement according to a comparative example seen from a vehicle upper side, the bumper reinforcement being joined to a vehicle body front end portion.

Hereinafter, a bumper reinforcement according to an embodiment of the disclosure is described with reference to the drawings. In the description of the embodiment below, the same reference numeral is used for the same or equivalent parts in the drawings and explanation thereof is not repeated.

In the drawings, a vehicle right side and a vehicle left side seen from an inside of a vehicle are represented by an arrow X1 and an arrow X2, respectively, vehicle front side and a vehicle rear side are represented by an arrow Y1 and an arrow Y2, respectively, and a vehicle upper side and a vehicle lower side are represented by an arrow Z1 and an arrow Z2, respectively. These directions are applicable to the bumper reinforcement before being attached to a vehicle body, and also to the bumper reinforcement after being attached to the vehicle body. The vehicle right side X1 is a first side the vehicle width direction, and the vehicle left side X2 is a second side of the vehicle width direction.

First of all, a bumper reinforcement according to a comparative example is described with reference to the drawings. FIG. 1 is a view seen from a vehicle upper side, and shows a state where the bumper reinforcement according to the comparative example is joined to a vehicle body front end portion.

As shown in FIG. 1, the bumper reinforcement 900 according to the comparative example does not include a reinforcing member described later, and is made only of a body portion 910. The body portion 910 includes a first standard rigidity region 911a, a high rigidity region 912, and a second standard rigidity region 911b that are arrayed next to each other in this order in the vehicle width direction. The bumper reinforcement 900 according to the comparative example also includes high rigidity side regions 915 on outer sides of the first standard rigidity region 911a and the second standard rigidity region 911b in the vehicle width direction, respectively. The high rigidity side regions 915 have rigidity higher than those of the first standard rigidity region 911a and the second standard rigidity region 911b.

Described next is a positional relation among the bumper reinforcement and components of a vehicle body when the bumper reinforcement is attached to the vehicle body.

As shown in FIG. 1, a first end and a second end of the bumper reinforcement 900 in the vehicle width direction are attached to vehicle body skeleton members 13 through vehicle body front end portions 11, respectively. The vehicle body skeleton members 13 extend in a vehicle front-rear direction. The vehicle body front end portions 11 are, for example, crush boxes, and the vehicle body skeleton members 13 are, for example, front side members. Each of the two vehicle body skeleton members 13 is joined to a partition portion 12 that is a part of the vehicle body. The partition portion 12 is, for example, a dashboard extending in the vehicle width direction.

An engine unit 15 is arranged behind the bumper reinforcement 900 in the vehicle front-rear direction. This means that the engine unit 15 is arranged between the two vehicle body skeleton members 13 in the vehicle width direction. End portions of the engine unit 15 in the vehicle width direction are connected with the vehicle body skeleton members 13 through connecting portions 14, respectively, and thus the engine unit 15 is supported by the vehicle body skeleton members 13. The connecting portions 14 are, for example, engine mounts.

The engine unit 15 includes a first mechanical portion 15a and a second mechanical portion 15b that are arranged next to each other in the vehicle width direction and fastened to each other. In the vehicle width direction, a width of the first mechanical portion 15a is larger than a width of the second mechanical portion 15b. Here, a first boundary position 913a of the body portion 910 is arranged in front of the first mechanical portion 15a. A second boundary position 913b of the body portion 910 is arranged in front of the second mechanical portion 15b.

Further, the engine unit 15 is arranged between the bumper reinforcement 900 and the partition portion 12 in the vehicle front-rear direction. A rear surface of the first mechanical portion 15a in the vehicle front-rear direction faces the partition portion 12 of the vehicle body 10. Behind the second mechanical portion 15b in the vehicle front-rear direction, a rear support portion 17 is provided. The rear support portion 17 is fixed to the partition portion 12 of the vehicle body 10.

The first mechanical portion 15a is, for example, an engine, and the second mechanical portion 15b is, for example, a transaxle. The rear support portion 17 is, for example, a gearbox.

Hereinafter, description is given with reference to the drawings regarding operations when a center pole collision occurs to the vehicle body 10 in which the bumper reinforcement 900 according to the comparative example is provided.

Figure 2:
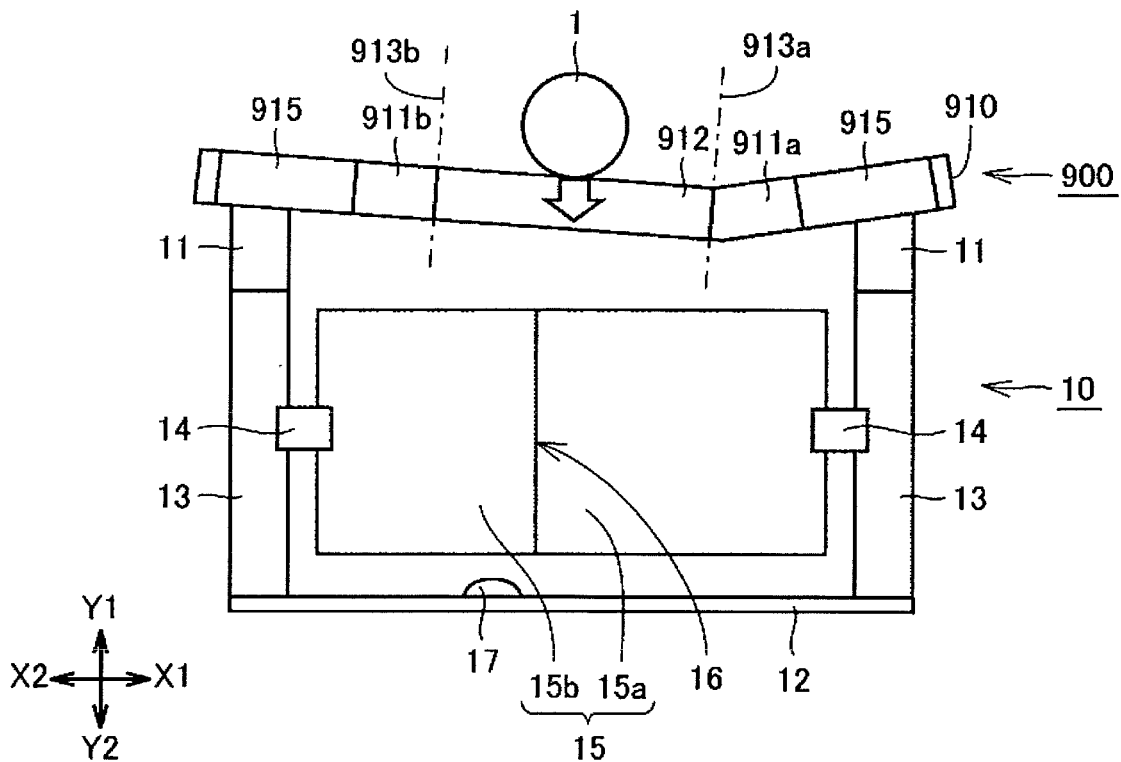
FIG. 2 is a view seen from the vehicle upper side, the view showing a vehicle body to which the bumper reinforcement according to the comparative example is attached, and an example of a state of the vehicle body immediately after a center pole collision occurs.

FIG. 2 is a view from the vehicle upper side and shows an example of a state immediately after the center pole collision occurs to the vehicle body to which the bumper reinforcement according to the comparative example is attached.

As shown in FIG. 2, at the time of the center pole collision, a pole 1 collides with an almost center part of the bumper reinforcement 900 in the vehicle width direction from the vehicle front side towards the vehicle rear side as shown by an outlined arrow.

In the bumper reinforcement 900 according to the comparative example, when the center pole collision occurs, a large load acts on each of the first boundary position 913a and the second boundary position 913b that are positioned at both ends of the high rigidity region 912 in the vehicle width direction, respectively. Therefore, the bumper reinforcement 900 is bent first at either one of the first boundary position 913a and the second boundary position 913b. This means that whether the bumper reinforcement 900 according to the comparative example is bent first at the first boundary position 913a or at the second boundary position 913b is not controlled.

FIG. 2 shows a state where the bumper reinforcement 900 is bent so as to project to the vehicle rear side at the first boundary position 913a before being bent at the second boundary position 913b. As the bumper reinforcement 900 is bent further from the state shown in FIG. 2, the bent portion of the bumper reinforcement 900 collides with the engine unit 15.

As the bent portion of the bumper reinforcement 900 collides with the engine unit 15, a load towards the vehicle rear side acts on a front surface of the first mechanical portion 15a. As a result, the first mechanical portion 15a is shifted to the vehicle rear side while still being joined to the second mechanical portion 15b.

Figure 3:
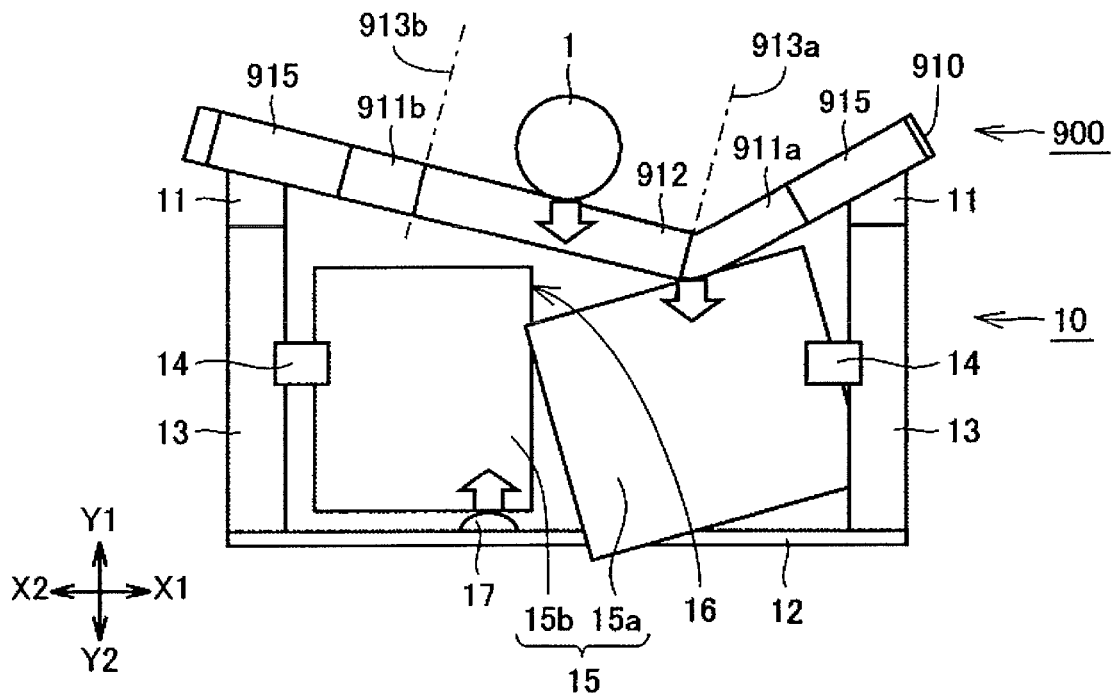
FIG. 3 is a view seen from the vehicle upper side, the view showing the vehicle body to which the bumper reinforcement according to the comparative example is attached, and a state where a load towards the vehicle rear side from a bent portion of the bumper reinforcement that is bent due to the center pole collision is acting on a first mechanical portion.

FIG. 3 is a view from the vehicle upper side and shows the vehicle body to which the bumper reinforcement according to the comparative example is attached, and a state where a load towards the vehicle rear side from the bent portion of the bumper reinforcement that is bent due to the center pole collision is acting on the first mechanical portion.

Due to the action of the load towards the vehicle rear side form the bent portion of the bumper reinforcement 900, the second mechanical portion 15b that is shifted to the vehicle rear side while still being joined to the first mechanical portion 15a comes into contact with the rear support portion 17. Because of this, a load towards the vehicle front side from the rear support portion 17 acts on the second mechanical portion 15b. Meanwhile, the load towards the vehicle rear side from the bent portion of the bumper reinforcement 900 acts on the first mechanical portion 15a. As a result, shear force acts on a fastening surface 16 between the first mechanical portion 15a and the second mechanical portion 15b.

As the shear force acts on the fastening surface 16, the engine unit 15 is split from the fastening surface 16 as shown in FIG. 3, and the first mechanical portion 15a and the second mechanical portion 15b are separated from each other. The separated first mechanical portion 15a presses the partition portion 12 of the vehicle body 10 locally.

In order to inhibit that the partition portion 12 of the vehicle body 10 is pressed locally, it is necessary to control a position of a spot of the bumper reinforcement in the vehicle width direction, the spot being bent first when a center pole collision occurs.

Next, a bumper reinforcement according to an embodiment of the disclosure is described with reference to the drawings. A configuration of the vehicle body 10 is similar to that of the comparative example, and the description thereof is not repeated.

Figure 4:
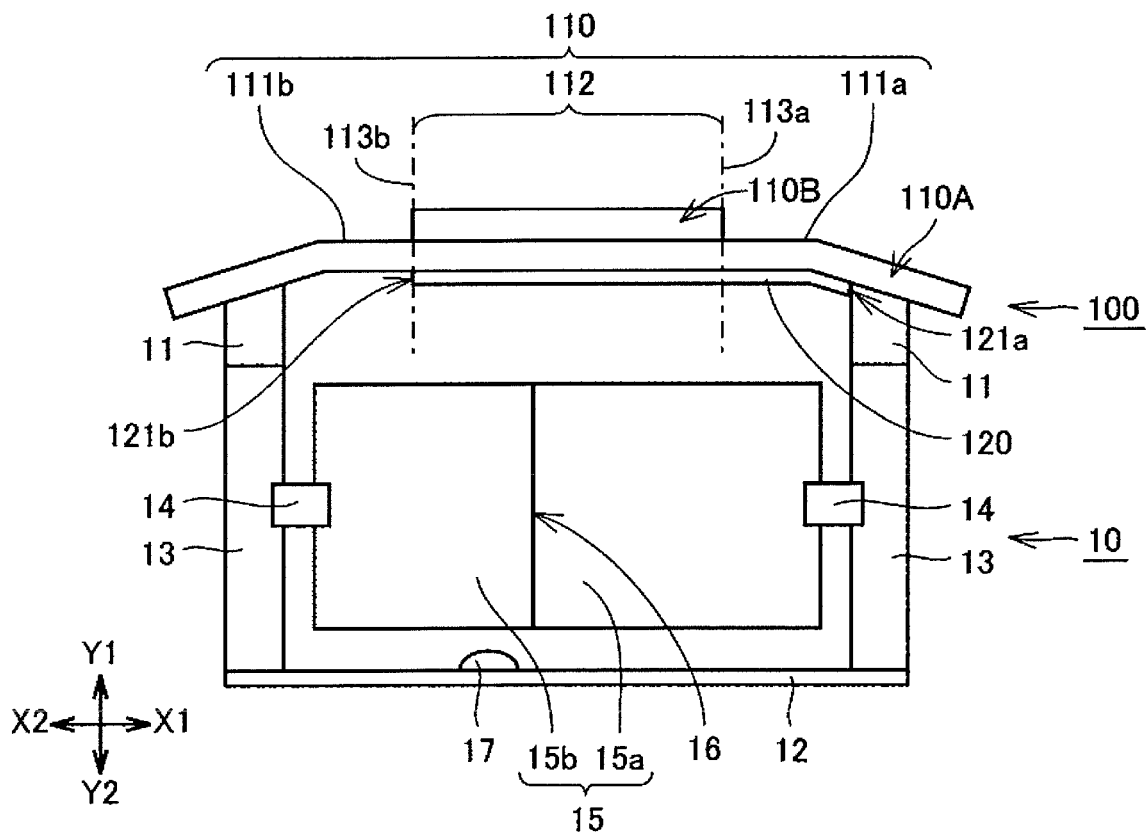
FIG. 4 is a view seen from a vehicle upper side, the view showing a state where a bumper reinforcement according to an embodiment of the disclosure is joined to a vehicle body front end portion.
Figure 5:
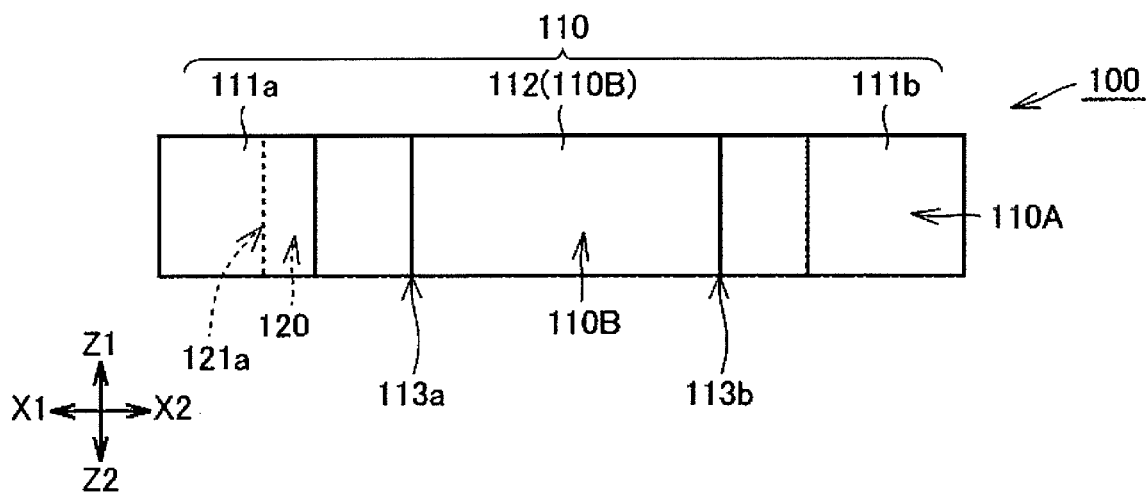
FIG. 5 is a view seen from a vehicle front side, the view showing the bumper reinforcement shown in FIG. 4.

FIG. 4 is a view from a vehicle upper side and shows a state where the bumper reinforcement according to the embodiment of the disclosure is joined to a vehicle body front end portion. FIG. 5 is a view from a vehicle front side and shows the bumper reinforcement shown in FIG. 4.

As shown in FIG. 4 and FIG. 5, the bumper reinforcement 100 according to the embodiment of the disclosure includes a body portion 110 and a reinforcing member 120. The body portion 110 extends in the vehicle width direction, and a first-side portion and a second-side portion of the body portion 110 in the vehicle width direction are joined to the vehicle body front end portions 11, respectively.

As shown in FIG. 4 and FIG. 5, in this embodiment, the body portion 110 includes a base material 110A, and a high rigidity member 110B having rigidity higher than that of the base material 110A.

As shown in FIG. 4, the base material 110A extends in the vehicle width direction, and a first-side end portion and a second-side end portion of the base material 110A in the vehicle width direction are directly joined to the vehicle body front end portions 11, respectively. Since a first end and a second end of the base material 110A in the vehicle width direction are bent towards the vehicle rear side, a center portion of the base material 110A in the vehicle width direction is positioned in front of the first end and the second end of the base material 110A in the vehicle width direction, when the base material 110A is seen in the vehicle front-rear direction. The base material 110A may have a shape that extends in the vehicle width direction and also bent in a projecting manner frontward in the vehicle front-rear direction.

As shown in FIG. 4, in this embodiment, the base material 110A extends in a state where a thickness of the base material 110A in the vehicle front-rear direction is almost uniform. As shown in FIG. 5, in this embodiment, the base material 110A extends in a state where a length of the base material 110A in an upper-lower direction is almost uniform.

In this embodiment, the base material 110A is made from iron. However, a material for the base material 110A is not limited to iron, and may be different metals such as aluminum.

As shown in FIG. 4, in this embodiment, the high rigidity member 110B is joined to a front surface of the base material 110A in the vehicle front-rear direction. The high rigidity member 110B may be joined to a rear surface of the base material 110A in the vehicle front-rear direction. In this embodiment, the high rigidity member 110B is joined to the base material 110A by welding. The high rigidity member 110B may be joined to the base material 110A by a joining material.

As shown in FIG. 4, in this embodiment, the high rigidity member 110B is arranged at a position in an almost center of the body portion 110 in the vehicle width direction. The high rigidity member 110B extends in a state where a thickness of the high rigidity member 110B in the vehicle front-rear direction is almost uniform. As shown in FIG. 5, in this embodiment, the high rigidity member 110B extends in a state where a length of the high rigidity member 110B in the upper-lower direction is almost uniform.

In this embodiment, the high rigidity member 110B is made from aluminum. A material of the high rigidity member 110B is not limited to aluminum, and may be metal other than aluminum as long as the high rigidity member 110B is configured to have higher rigidity than that of the base material 110A.

As shown in FIG. 4, in this embodiment, a high rigidity region 112 is configured by including a portion of the base material 110A where the high rigidity member 110B is joined, and the high rigidity member 110B.

Further, in this embodiment, portions of the base material 110A where the high rigidity member 110B is not joined configure a first standard rigidity region 111a and a second standard rigidity region 111b. The first standard rigidity region 111a is adjacent to a first end of the high rigidity region 112 in the vehicle width direction, and the second standard rigidity region 111b is adjacent to a second end of the high rigidity region 112 in the vehicle width direction.

As described above, in this embodiment, the body portion 110 includes the first standard rigidity region 111a, the high rigidity region 112, and the second standard rigidity region 111b that are arrayed in this order next to each other in the vehicle width direction. The high rigidity region 112 is positioned in the center of the body portion 110 in the vehicle width direction and has higher rigidity than those of the first standard rigidity region 111a and the second standard rigidity region 111b. The first standard rigidity region 111a is positioned on the first side of the high rigidity region 112 in the vehicle width direction. The second standard rigidity region 111b is positioned on the second side of the high rigidity region 112 in the vehicle width direction.

In this embodiment, the portions of the base material 110A where the high rigidity member 110B is not joined extend with almost uniform rigidity. The portions of the base material 110A where the high rigidity member 110B is not joined may extend with uneven rigidity. For example, in the portions of the base material 110A where the high rigidity member 110B is not joined, regions other than the first standard rigidity region 111a and the second standard rigidity region 111b that are adjacent to the high rigidity region 112 may have rigidity that is the same as or larger than rigidity of the high rigidity region 112.

The first standard rigidity region 111a, the second standard rigidity region 111b, and the high rigidity region 112 are not necessarily limited to those that are configured by the base material 110A and the high rigidity member 110B as described above.

For example, voids may be formed inside the base material 110A, and a high rigidity material may be filled in the voids in a portion of the base material 110A where the high rigidity region 112 is configured. Thus, the high rigidity region 112 has higher rigidity than those of the first standard rigidity region 111a and the second standard rigidity region 111b.

Alternatively, in the portion of the base material 110A where the high rigidity region 112 is configured, the thickness of the base material 110A in the vehicle front-rear direction may be larger than those of the portions of the base material 110A where the first standard rigidity region 111a and the second standard rigidity region 111b are configured. Thus, the high rigidity region 112 has higher rigidity than those of the first standard rigidity region 111a and the second standard rigidity region 111b.

As shown in FIG. 4, the reinforcing member 120 is joined to the body portion 110 along the body portion 110. In this embodiment, the reinforcing member 120 is joined to a surface of the body portion 110 on the vehicle body 10 side. Also, as shown in FIG. 5, a length of the reinforcing member 120 is almost the same as a length of the body portion 110 in the upper-lower direction.

As shown in FIG. 4, the reinforcing member 120 at least partially overlaps the high rigidity region 112 and the first standard rigidity region 111a through a first boundary position 113a so that the reinforcing member 120 crosses the first boundary position 113a between the high rigidity region 112 and the first standard rigidity region 111a in the vehicle width direction.

In this embodiment, the reinforcing member 120 overlaps the base material 110A from a second end portion of the high rigidity region 112 through the vicinity of a first end portion of the base material 110A on an inner side of the vehicle in the vehicle width direction. This means that a first edge 121a of the reinforcing member 120 in the vehicle width direction is positioned near the vehicle body front end portion 11 on the first side in the vehicle width direction. The reinforcing member 120 may overlap the first standard rigidity region 111a throughout an entire length from a first end through a second end of the first standard rigidity region 111a in the vehicle width direction.

In this embodiment, in the vehicle width direction, a position of a second edge 121b of the reinforcing member 120 almost coincides with a second boundary position 113b between the high rigidity region 112 and the second standard rigidity region 111b.

In this embodiment, the reinforcing member 120 is made from carbon fiber reinforced plastic (CFRP). Carbon fiber contained in the carbon fiber reinforced plastic extends along the vehicle width direction. Specifically, the carbon fiber reinforced plastic is made of a tape-shaped unidirectional reinforcing member (UD). After the tape-shaped unidirectional reinforcing member is adhered to the body portion 110, resin components of the unidirectional reinforcing member are hardened. Thus, the reinforcing member 120 is joined to the body portion 110.

Description is given below with reference to the drawings regarding operations when a center pole collision occurs to the vehicle body 10 in which the bumper reinforcement 100 according to the embodiment of the disclosure is provided.

Figure 6:
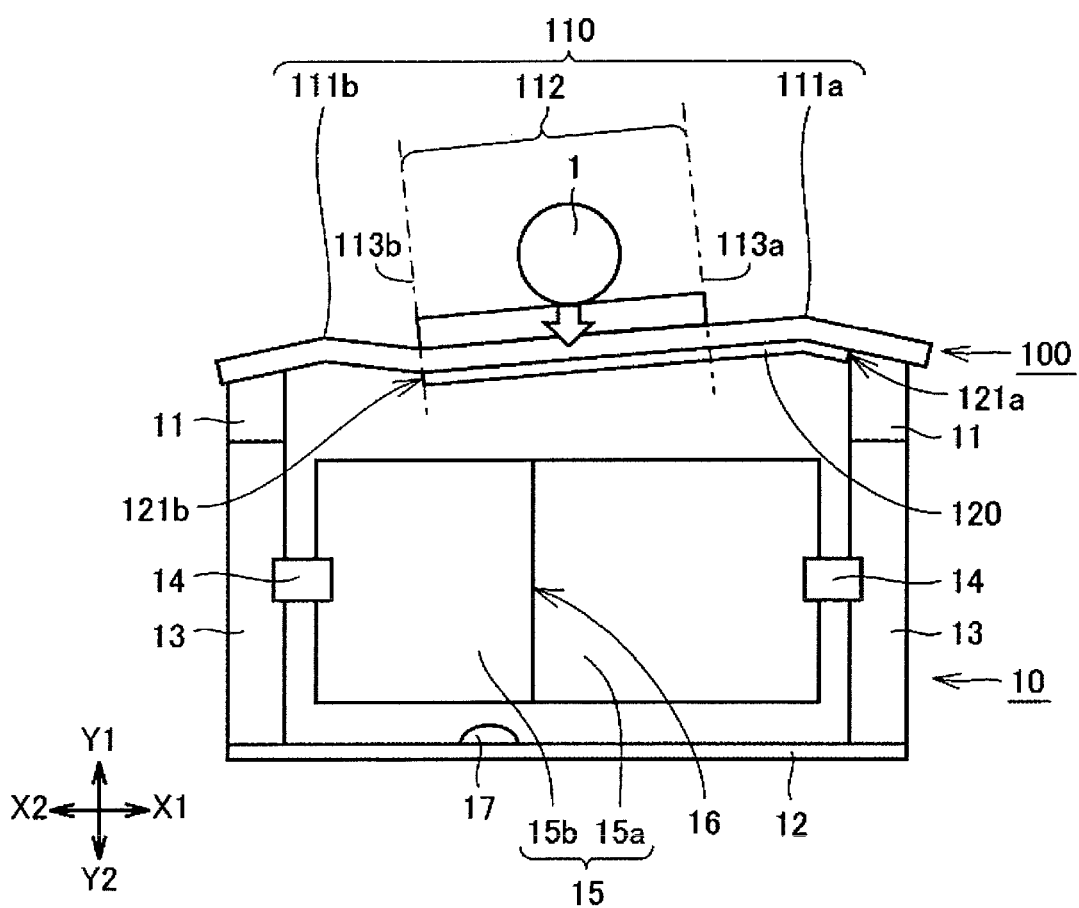
FIG. 6 is a view seen from the vehicle upper side, the view showing a state immediately after a center pole collision occurs to a vehicle body to which the bumper reinforcement according to the embodiment of the disclosure is attached.

FIG. 6 is a view from the vehicle upper side and shows the vehicle body to which the bumper reinforcement according to the embodiment of the disclosure is attached and a state immediately after a center pole collision occurs.

As shown in FIG. 6, at the time of the center pole collision, in the bumper reinforcement 100 according to this embodiment, a large load acts on each of the first boundary position 113a and the second boundary position 113b that are both ends of the high rigidity region 112 in the vehicle width direction. In the bumper reinforcement 100 according to this embodiment, rigidity is lower in the second boundary position 113b where the reinforcing member 120 is not arranged, than the first boundary position 113a where the reinforcing member 120 is arranged. Therefore, the bumper reinforcement 100 is bent first at the second boundary position 113b. This means that it is controlled that the bumper reinforcement 100 according to this embodiment is bent first at the second boundary position 113b out of the first boundary position 113a and the second boundary position 113b.

Figure 7:
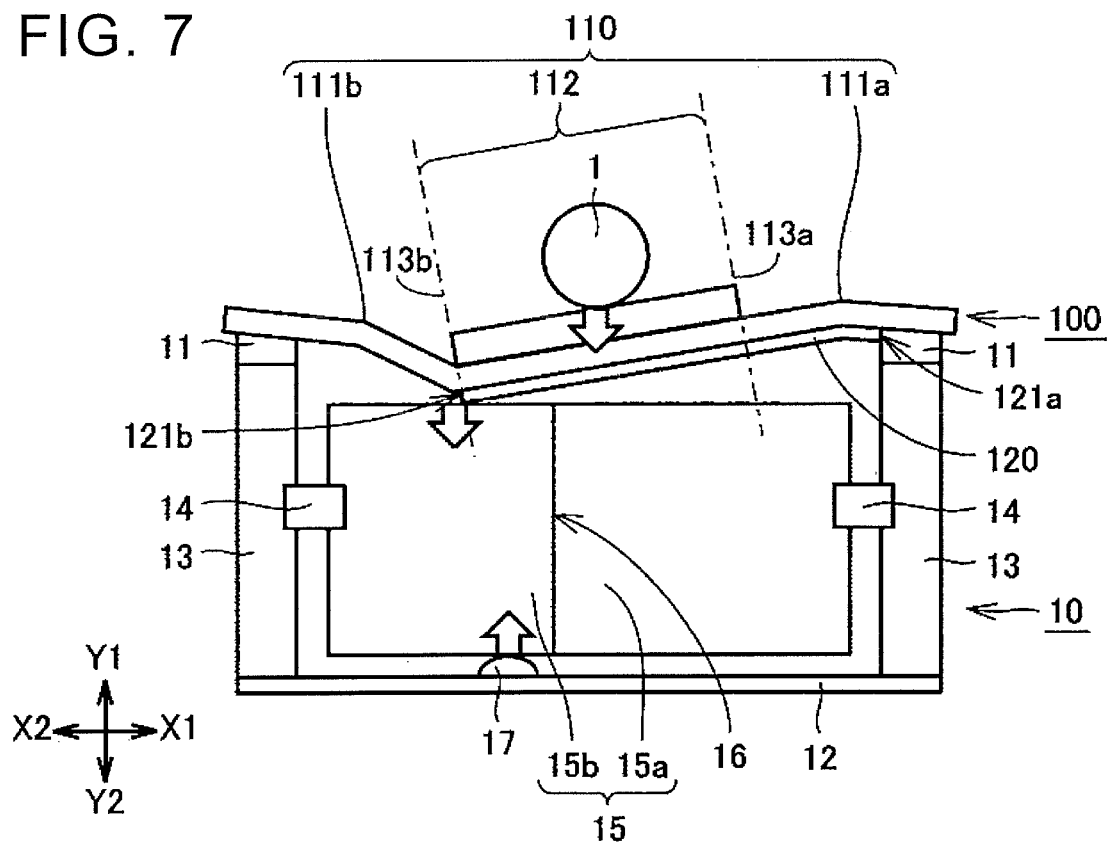
FIG. 7 is a view seen from the vehicle upper side, the view showing the vehicle body to which the bumper reinforcement according to the embodiment of the disclosure is attached, and a state where a load towards the vehicle rear side from a bent portion of the bumper reinforcement that is bent due to the center pole collision is acting on a second mechanical portion.

FIG. 7 is a view seen from the vehicle upper side and shows the vehicle body to which the bumper reinforcement according to the embodiment of the disclosure is attached, and a state where a load towards the vehicle rear side from a bent portion of the bumper reinforcement that is bent due to the center pole collision is acting on the second mechanical portion.

Due to action of the load towards the vehicle rear side from the bent portion of the bumper reinforcement 100, the second mechanical portion 15b shifted to the vehicle rear side in a state of still being joined to the first mechanical portion 15a comes into contact with the rear support portion 17. Because of this, a load towards the vehicle front side acts on the second mechanical portion 15b from the rear support portion 17. Meanwhile, no load acts on the first mechanical portion 15a. Therefore, shear force does not act on the fastening surface 16 between the first mechanical portion 15a and the second mechanical portion 15b.

As shown in FIG. 7, in the state where the bent portion of the bumper reinforcement 100 and the second mechanical portion 15b are in contact with each other, a load applied by the pole 1 towards the vehicle rear side acts intensively on the first boundary position 113a. Therefore, the bumper reinforcement 100 is bent at the first boundary position 113a after being bent at the second boundary position 113b.

Figure 8:
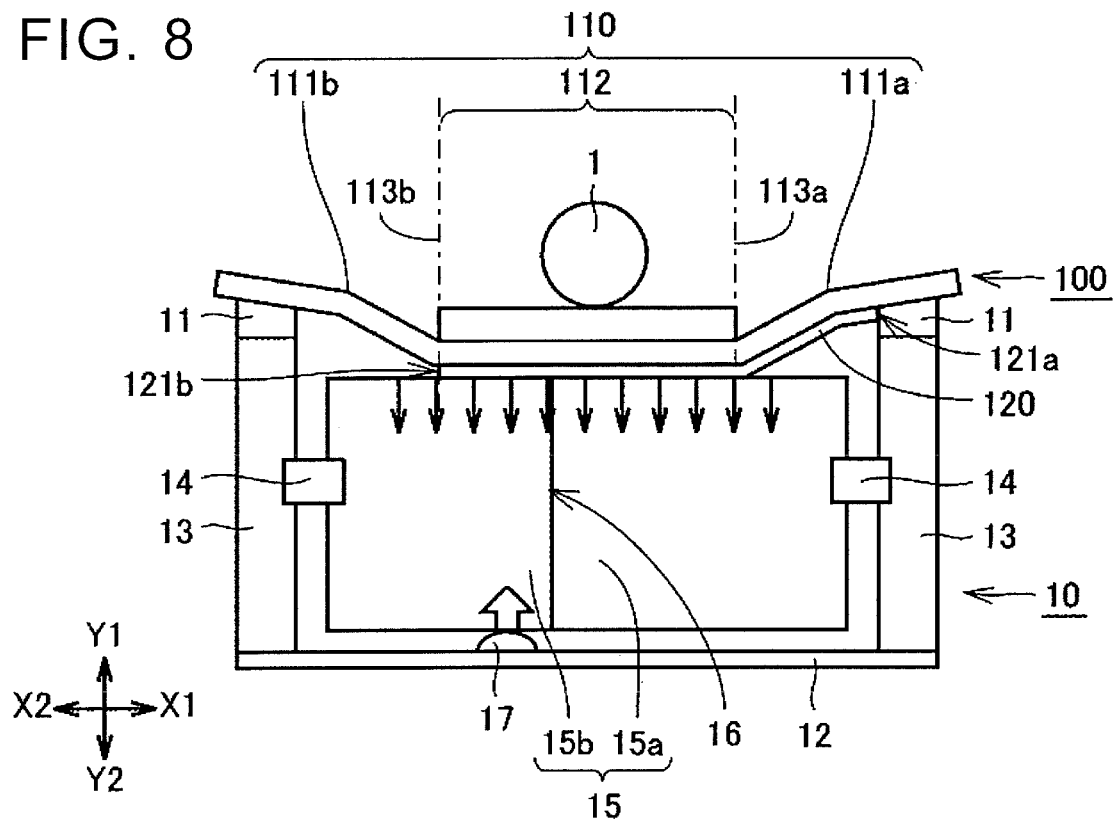
FIG. 8 is a view seen from the vehicle upper side, the view showing the vehicle body to which the bumper reinforcement according to the embodiment of the disclosure is attached, and a state where the bumper reinforcement is bent at a first boundary position after being bent at a second boundary position due to the center pole collision.

FIG. 8 is a view seen from the vehicle upper side and shows the vehicle body to which the bumper reinforcement according to the embodiment of the disclosure is attached, and a state where the bumper reinforcement is bent at the first boundary position after being bent at the second boundary position due to the center pole collision.

As shown in FIG. 8, due to the center pole collision, the bumper reinforcement 100 is bent at the first boundary position 113a after being bent at the second boundary position 113b. Thus, a portion of the bumper reinforcement 100 located in the high rigidity region 112 comes into surface contact with the engine unit 15.

As shown in FIG. 8, the portion of the bumper reinforcement 100 located in the high rigidity region 112 comes into surface contact with both of the first mechanical portion 15a and the second mechanical portion 15b of the engine unit 15. Because of this, a load at the time of collision is dispersed and received by the entire engine unit 15. As a result, it is possible to reduce shear force acting on the fastening surface 16 between the first mechanical portion 15a and the second mechanical portion 15b. It is thus possible to inhibit that the partition portion 12 of the vehicle body 10 is pressed locally.

In the bumper reinforcement 100 according to the embodiment of the disclosure, the reinforcing member 120 at least partially overlaps the high rigidity region 112 and the first standard rigidity region 111a through the first boundary position 113a so that the reinforcing member 120 crosses the first boundary position 113a between the high rigidity region 112 and the first standard rigidity region 111a in the vehicle width direction.

With this configuration, it is controlled so that the bumper reinforcement 100 according to the embodiment of the disclosure is bent first at the second boundary position 113b between the high rigidity region 112 and the second standard rigidity region 111b when a center pole collision occurs, and it is thus possible to inhibit that the partition portion 12 of the vehicle body 10 is pressed locally. This means that it is possible to inhibit that the vehicle body is pressed locally.

In the bumper reinforcement 100 according to the embodiment of the disclosure, the position of the second edge 121b of the reinforcing member 120 almost coincides with the second boundary position 113b between the high rigidity region 112 and the second standard rigidity region 111b in the vehicle width direction.

With this configuration, the bumper reinforcement 100 has a significant difference in rigidity at the second boundary position 113b. Therefore, when a center pole collision occurs, it is possible to stably ensure that the bumper reinforcement 100 is bent first at the second boundary position 113b.

In the vehicle width direction, the position of the second edge 121b of the reinforcing member 120 does not need to coincide with the second boundary position 113b. For example, the position of the second edge 121b of the reinforcing member 120 may be on the high rigidity region 112 side with respect to the second boundary position 113b. Also, the position of the second edge 121b of the reinforcing member 120 may be on the second standard rigidity region 111b side with respect to the second boundary position 113b. However, in this case, the position of the second edge 121b must be in a range that maintains the configuration that the bumper reinforcement 100 is bent first at the second boundary position 113b before being bent at the first boundary position 113a. For example, a slit may be provided at a position that overlaps the second boundary position 113b of the reinforcing member 120. Thus, rigidity of the bumper reinforcement 100 at the second boundary position 113b is smaller than that of the remaining portion.

The reinforcing member 120 may overlap the first standard rigidity region 111a throughout the entire length in the vehicle width direction from the first end through the second end of the first standard rigidity region 111a. In this case, the reinforcing member 120 is joined to a surface of the body portion 110 on the opposite side from the vehicle body 10.

With this configuration, a difference in rigidity in the bumper reinforcement 100 becomes even more significant at the second boundary position 113b. Therefore, when a center pole collision occurs, it is possible to more stably ensure that the bumper reinforcement 100 is bent first at the second boundary position 113b. Further, it is possible to stably ensure that the bumper reinforcement 100 is bent at the first boundary position 113a after the bumper reinforcement 100 is bent at the second boundary position 113b. The reinforcing member 120 may partially overlap the first standard rigidity region 111a of the body portion 110 in the vehicle width direction.

In the embodiment of the disclosure, the reinforcing member 120 is joined to the surface of the body portion 110 on the vehicle body 10 side.

With this configuration, at the time of a center pole collision, tensile stress in the vehicle width direction is generated in the reinforcing member 120. Therefore, it is possible to reduce tensile stress generated in the body portion 110, and it is thus possible to effectively reinforce the bumper reinforcement 100.

The reinforcing member 120 may be joined to the surface of the body portion 110 on the opposite side from the vehicle body 10. In this case, since compressive stress is generated in the reinforcing member 120, it is preferred that the reinforcing member 120 is made from metal such as aluminum and joined to the body portion 110 by welding or the like.

In the embodiment of the disclosure, the reinforcing member 120 is made from carbon fiber reinforced plastic.

With this configuration, it is possible to effectively reinforce the bumper reinforcement 100 while a weight of the reinforcing member 120 is reduced. The material of the reinforcing member 120 is not limited to the carbon fiber reinforced plastic, and the reinforcing member 120 may be made from metal such as aluminum as described above.

In the embodiment of the disclosure, carbon fiber contained in the carbon fiber reinforced plastic extends along the vehicle width direction.

With this configuration, since the carbon fiber is able to receive tensile stress generated in the reinforcing member 120 in the vehicle width direction, it is possible to effectively reinforce the bumper reinforcement 100. An extending direction of the carbon fiber contained in the carbon fiber reinforced plastic is not limited to the vehicle width direction, and the extending direction of the carbon fiber is not limited to a single direction and may be two directions orthogonal to each other. Further, the configuration of the carbon fiber contained in the carbon fiber reinforced plastic is not limited to the one in which long fiber is arranged with orientation, and may be a configuration in which short fiber is arranged without orientation.

The embodiment described above is an example only in every aspect and should not be considered as a limitation. The scope of the disclosure is represented by the scope of claims instead of the description above, and is intended to include all changes within the scope of the claims and its equivalent meanings and scopes.

In the foregoing bumper reinforcement, the reinforcing member may be provided so that a position of an edge of the reinforcing member on the second direction side almost coincides with a second boundary position between the high rigidity region and the second standard rigidity region in the vehicle width direction.

In the foregoing bumper reinforcement, the reinforcing member may be provided so as to overlap the first standard rigidity region throughout an entire length of the first standard rigidity region in the vehicle width direction from an end on the first direction side through an end on the second direction side of the first standard rigidity region.

In the foregoing bumper reinforcement, the reinforcing member may be joined to a surface of the body portion, the surface being located on a vehicle body side. Further, in the foregoing bumper reinforcement, the reinforcing member may be carbon fiber reinforced plastic.

In the foregoing bumper reinforcement, carbon fiber contained in the carbon fiber reinforced plastic of the reinforcing member may extend along the vehicle width direction.

With the foregoing configuration, a position of a spot of the bumper reinforcement in the vehicle width direction is controlled, the spot being bent first when a center pole collision occurs. Thus, it is possible to inhibit that the body of the vehicle is locally pressed.

What is claimed is:

1. A bumper reinforcement comprising:
    a body portion that extends in a vehicle width direction and is joined to a vehicle body front end portion through portions of the body portion on a first direction side and a second direction side in the vehicle width direction; and
    a reinforcing member joined to the body portion along the body portion, wherein:
    the body portion includes a first standard rigidity region, a high rigidity region, and a second standard rigidity region that are arrayed next to each other in this order in the vehicle width direction;
    the high rigidity region has rigidity higher than rigidity of the first standard rigidity region and rigidity of the second standard rigidity region and is positioned in a center of the body portion in the vehicle width direction;
    the first standard rigidity region is positioned on the first direction side of the high rigidity region in the vehicle width direction;
    the second standard rigidity region is positioned on the second direction side of the high rigidity region in the vehicle width direction; and
    the reinforcing member is provided so as to at least partially overlap the high rigidity region and the first standard rigidity region through a first boundary position so that the reinforcing member crosses the first boundary position, the first boundary position being at a position of a boundary between the high rigidity region and the first standard rigidity region in the vehicle width direction.

2. The bumper reinforcement according to claim 1, wherein the reinforcing member is provided so that a position of an edge of the reinforcing member on the second direction side almost coincides with a second boundary position between the high rigidity region and the second standard rigidity region in the vehicle width direction.

3. The bumper reinforcement according to claim 1, wherein the reinforcing member is provided so as to overlap the first standard rigidity region throughout an entire length of the first standard rigidity region in the vehicle width direction from an end on the first direction side through an end on the second direction side of the first standard rigidity region.

4. The bumper reinforcement according to claim 1, wherein the reinforcing member is joined to a surface of the body portion, the surface being located on a vehicle body side.

5. The bumper reinforcement according to claim 1, wherein the reinforcing member is carbon fiber reinforced plastic.

6. The bumper reinforcement according to claim 5, wherein carbon fiber contained in the carbon fiber reinforced plastic of the reinforcing member extends along the vehicle width direction.

7. A bumper reinforcement according to claim 1, wherein in the vehicle width direction, a first distance from a position of an edge of the reinforcing member on the first direction side to a position of the center of the body portion is greater than a second distance from a position of an edge of the reinforcing member on the second direction side to the position of the center of the body portion.

* * * * *